(12) United States Patent
D'Mura et al.

(10) Patent No.: US 9,594,367 B2
(45) Date of Patent: Mar. 14, 2017

(54) SYSTEMS AND METHODS FOR PROCESS CONTROL INCLUDING PROCESS-INITIATED WORKFLOW

(75) Inventors: Paul R. D'Mura, Glendale, AZ (US); Kenneth S. Plache, Scottsdale, AZ (US); Michael D. Kalan, Highland Heights, OH (US); Kenwood H. Hall, Hudson, OH (US); Sujeet Chand, Brookfield, WI (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 1291 days.

(21) Appl. No.: 13/285,533

(22) Filed: Oct. 31, 2011

(65) Prior Publication Data
US 2013/0110274 A1 May 2, 2013

(51) Int. Cl.
*G06F 1/00* (2006.01)
*G05B 19/05* (2006.01)
*G05B 19/418* (2006.01)

(52) U.S. Cl.
CPC ....... *G05B 19/05* (2013.01); *G05B 19/41845* (2013.01); *G05B 2219/32182* (2013.01); *Y02P 90/12* (2015.11); *Y02P 90/16* (2015.11); *Y02P 90/22* (2015.11)

(58) Field of Classification Search
None
See application file for complete search history.

(56) References Cited

U.S. PATENT DOCUMENTS

| 4,815,190 A | * | 3/1989 | Haba et al. | 29/430 |
| 4,833,304 A | * | 5/1989 | Ueda | 219/518 |
| 4,894,908 A | * | 1/1990 | Haba et al. | 29/711 |

(Continued)

FOREIGN PATENT DOCUMENTS

| CN | 101853522 | 3/2012 |
| EP | 1422743 A1 | 5/2004 |
| WO | 2004031875 A1 | 4/2004 |

OTHER PUBLICATIONS

Maturana et al., "Distributed Multi Sensor Agent for Composite Curing Control", IEEE, 2008, 1236-1243.*

(Continued)

*Primary Examiner* — Robert Fennema
*Assistant Examiner* — Thomas Stevens
(74) *Attorney, Agent, or Firm* — Fletcher Yoder, P.C.

(57) ABSTRACT

A process controller a procedure module that includes instructions for executing a procedure, and a plurality of supplemental procedure modules, each of which includes instructions for executing one of a plurality of supplemental procedures. The process controller also includes a process monitor processor configured to receive an input electronic signal indicative of a status of a process feature, apply logic based on the input electronic signal, and generate an output electronic signal in response to the input electronic signal. The process controller also includes a sequence engine processor configured to execute the procedure, receive the output electronic signal, apply logic based on the output electronic signal, select one or more of the plurality of supplemental procedures based on the received output electronic signal, and execute the selected one or more of the plurality of supplemental procedures.

23 Claims, 8 Drawing Sheets

(56) References Cited

U.S. PATENT DOCUMENTS

| | | | |
|---|---|---|---|
| 4,907,167 A * | 3/1990 | Skeirik | 700/10 |
| 5,016,528 A * | 5/1991 | Chen | 99/353 |
| 5,168,444 A * | 12/1992 | Cukor et al. | 705/330 |
| 5,259,909 A * | 11/1993 | de Villeneuve et al. | 156/345.26 |
| 5,329,431 A * | 7/1994 | Taylor et al. | 362/85 |
| 5,461,570 A * | 10/1995 | Wang et al. | 700/110 |
| 5,651,193 A * | 7/1997 | Rhodes et al. | 34/531 |
| 5,710,700 A * | 1/1998 | Kurtzberg et al. | 700/29 |
| 5,763,741 A * | 6/1998 | Payne | 800/260 |
| 5,839,356 A * | 11/1998 | Dornbush et al. | 99/331 |
| 5,985,214 A * | 11/1999 | Stylli et al. | 422/65 |
| 6,073,109 A | 6/2000 | Flores et al. | |
| 6,196,113 B1 * | 3/2001 | Yung | 99/327 |
| 6,365,210 B1 * | 4/2002 | Schaible et al. | 426/94 |
| 7,139,627 B2 | 11/2006 | Obara et al. | |
| 7,242,995 B1 * | 7/2007 | Morgenson et al. | 700/103 |
| 7,706,895 B2 * | 4/2010 | Callaghan | 700/17 |
| 7,765,549 B1 * | 7/2010 | Lauer | 718/101 |
| 7,973,642 B2 * | 7/2011 | Schackmuth et al. | 340/5.92 |
| 8,271,103 B2 * | 9/2012 | Hendler et al. | 700/31 |
| 8,494,798 B2 * | 7/2013 | Kettaneh et al. | 702/83 |
| 2002/0072893 A1 * | 6/2002 | Wilson | 703/26 |
| 2002/0156548 A1 * | 10/2002 | Arackaparambil et al. | 700/108 |
| 2003/0109951 A1 * | 6/2003 | Hsiung et al. | 700/108 |
| 2004/0117624 A1 * | 6/2004 | Brandt et al. | 713/166 |
| 2005/0071039 A1 * | 3/2005 | Mitrovic | 700/121 |
| 2006/0184264 A1 * | 8/2006 | Willis et al. | 700/108 |
| 2007/0038492 A1 | 2/2007 | Ryan et al. | |
| 2007/0050070 A1 * | 3/2007 | Strain et al. | 700/99 |
| 2007/0079355 A1 * | 4/2007 | Chand et al. | 726/2 |
| 2007/0143398 A1 * | 6/2007 | Graham | 709/204 |
| 2007/0179652 A1 * | 8/2007 | Weigang et al. | 700/100 |
| 2007/0269297 A1 * | 11/2007 | Meulen et al. | 414/222.01 |
| 2007/0282476 A1 * | 12/2007 | Song et al. | 700/100 |
| 2008/0095196 A1 * | 4/2008 | Weatherhead et al. | 370/503 |
| 2008/0131237 A1 * | 6/2008 | van der Meulen | 414/217 |
| 2010/0223079 A1 * | 9/2010 | Roschelle et al. | 705/4 |
| 2014/0032125 A1 * | 1/2014 | Hawkins | 702/19 |

OTHER PUBLICATIONS

Hesketh et al, "Innovative and Economical Bench-scale Process Engineering Experiments", IEEE, 2000, pp. 327-334.*

Scholten-B.,"Integrating ISA-88 and ISA-95", Oridna ISA-95 & MES Competence Center, 2007, 13 pages.*

ABB's "Industrial System 800xA Production Management Batch Management Overview", 2006, 13 pages.*

European Search Report EP12190827 mailed on Jun. 13, 2014, 7 pages.

Office Action & Search Report for Chinese Application No. 201210448584.X issued Oct. 10, 2014, 11 pages.

* cited by examiner

SYSTEMS AND METHODS FOR PROCESS CONTROL INCLUDING PROCESS-INITIATED WORKFLOW

BACKGROUND

The present invention relates generally to control systems and, more particularly, to process control systems.

Process control systems are used in a variety of industries, such as oil refining, paper manufacturing, chemical manufacturing, power plants, and so forth. These systems may enable a small staff of operating personnel to operate a complex process from a control room. Process control systems may include a variety of process controllers, such as programmable logic controllers, distributed controller systems, or supervisory control and data acquisition systems, for example. In addition, process control systems may be characterized as discrete systems, batch systems, continuous systems, or a combination thereof. For example, in batch systems, a control sequence may be encoded within the process controller. Such control sequences may include a plurality of tasks or instructions that are performed to produce batches of a product. Operators may initiate or start such control sequences to begin producing the batches of product. Unfortunately, it is now recognized that it may be difficult for such batch control sequences to respond to changes in the status of equipment and/or materials used in making the product. For example, existing batch control sequences may be unable to execute or invoke other control sequences in response to such equipment and/or material changes.

BRIEF DESCRIPTION

In one embodiment, a process controller includes memory circuitry and processing circuitry. The memory circuitry includes a procedure module that includes instructions for executing a procedure. The memory circuitry also includes a plurality of supplemental procedure modules. Each of the plurality of supplemental procedure modules includes instructions for executing one of a plurality of supplemental procedures. The memory circuitry also includes a production record module that includes instructions for storing data corresponding to a production record. The processing circuitry includes a process monitor processor configured to receive an input electronic signal indicative of a status of a process feature, apply logic based on the input electronic signal, and generate an output electronic signal in response to the input electronic signal. The processing circuitry also includes a sequence engine processor configured to execute the procedure, receive the output electronic signal, apply logic based on the output electronic signal, select one or more of the plurality of supplemental procedures based on the received output electronic signal, execute the selected one or more of the plurality of supplemental procedures, and update the production record with data generated by the procedure and the one or more of the plurality of supplemental procedures.

In another embodiment, a program stored on a non-transitory computer readable storage medium includes computer code disposed on the computer readable storage medium. The code includes instructions for automating a process. The instructions include instructions for transmitting an input electronic signal indicative of a status of a process feature to a process monitor processor, instructions for applying logic by the process monitor processor based on the input electronic signal, and instructions for generating an output electronic signal from the process monitor processor in response to the input electronic signal. The instructions also include instructions for executing a procedure by a sequence engine processor, instructions for transmitting the output electronic signal from the process monitor processor to the sequence engine processor, and instructions for applying logic by the sequence engine processor based on the output electronic signal. The instructions also include instructions for selecting one or more of a plurality of supplemental procedures by the sequence engine processor based on the output electronic signal, instructions for executing the selected one or more of the plurality of supplemental procedures by the sequence engine processor, and instructions for updating a production record with data generated by the procedure and the one or more of the plurality of supplemental procedures.

In yet another embodiment, a method for controlling a process with an industrial automation system includes transmitting an input electronic signal indicative of a status of a process feature to a process monitor processor, applying logic by the process monitor processor based on the input electronic signal, and generating an output electronic signal from the process monitor processor in response to the input electronic signal. The method also includes executing a procedure by a sequence engine processor, transmitting the output electronic signal from the process monitor processor to the sequence engine processor, and applying logic by the sequence engine processor based on the output electronic signal. The method also includes selecting one or more of a plurality of supplemental procedures by the sequence engine processor based on the output electronic signal, executing the selected one or more of the plurality of supplemental procedures by the sequence engine processor, and updating a production record with data generated by the procedure and the one or more of the plurality of supplemental procedures.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
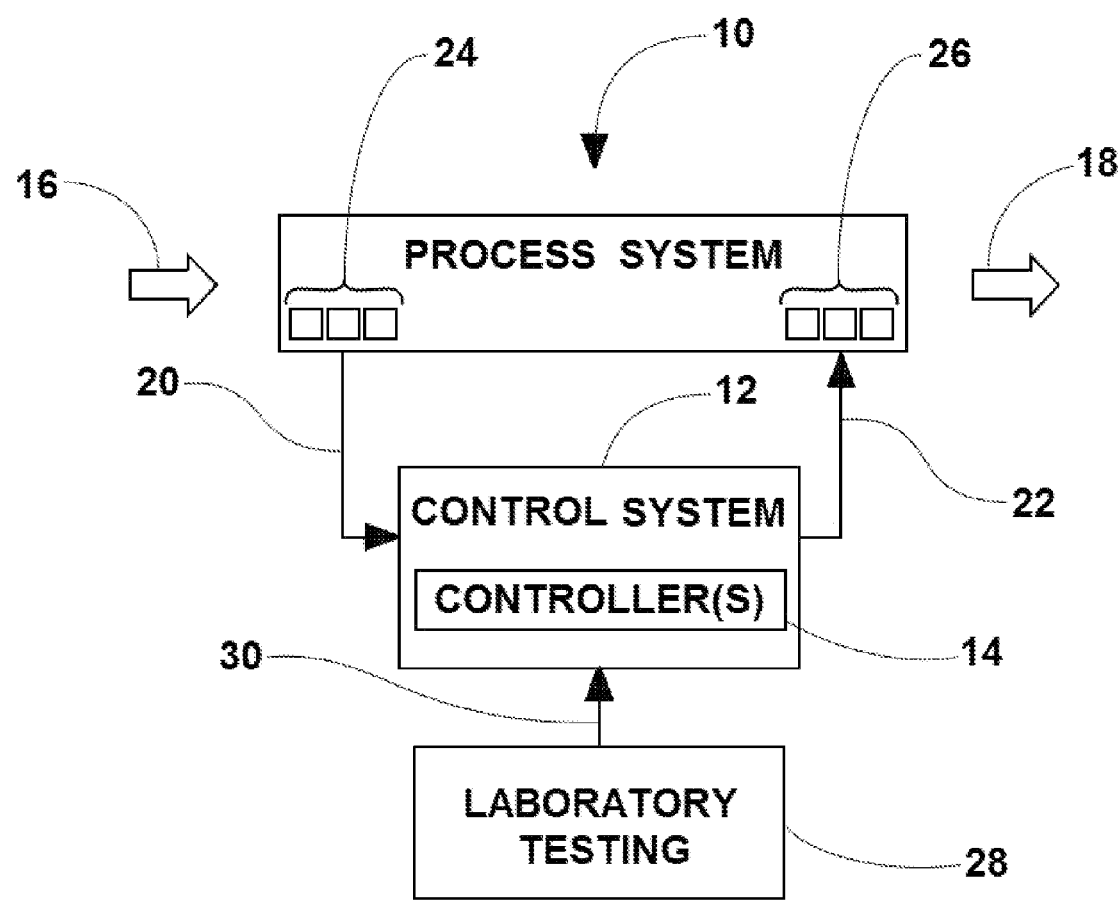
FIG. 1 is a diagrammatical representation of a process system equipped with a control system having one or more controllers in accordance with an embodiment of the present technique.

While the present disclosure may be susceptible to various modifications and alternative forms, specific embodiments have been shown by way of example in the drawings and tables and have been described in detail herein. However, it should be understood that the embodiments are not intended to be limited to the particular forms disclosed. Rather, the disclosure is to cover all modifications, equivalents, and alternatives falling within the spirit and scope of the disclosure as defined by the following appended claims. Further, although individual embodiments are discussed herein to simplify explanation, the disclosure is intended to cover all combinations of these embodiments.

As discussed in detail below, embodiments of the present technique function to provide memory circuitry and processing circuitry for an industrial control and automation system, such as a process controller, that provides process-initiated workflows. In particular, the memory circuitry may include various modules that include instructions for executing a procedure, executing one or more supplemental procedures, and storing data associated with the procedures and supplemental procedures in a production record. The processing circuitry may include a first processor configured to apply logic to an input electronic signal to generate an output electronic signal. The input electronic signal may be indicative of a change in the process. The processing circuitry may also include a second processor configured to execute the procedure, receive the output electronic signal, select one or more of the supplemental procedures based on the received output signal, execute the one or more selected supplemental procedures, and update the production record with data generated by the procedure and the one or more of the selected supplemental procedures. Thus, the process controller may be able to respond to changes in the process by executing the appropriate supplemental procedures. In other words, supplemental procedures or workflows are process-initiated in that changes in the process result in generation of supplemental workflows. In addition, the record may include historical and current data associated with the procedure and the selected supplemental procedures in a format readily accessible to operating personnel, engineers, and/or management.

Turning now to the drawings, and referring first to FIG. 1, a process system 10 is illustrated that is at least partially regulated by a control system 12 having one or more controllers 14. The process system 10 may be any conceivable type of process, such as a manufacturing process, a steady state or batch process, a chemical process, a material handling process, an energy production process, and so forth. In an exemplary embodiment, as will be described in further detail below with reference to FIGS. 5 through 8, the process system 10 may be implemented in the context of a bread making process. Thus, the process controller 14 may be a batch process controller in certain embodiments.

In general, the process system 10 of FIG. 1 may receive one or more inputs 16, and produce one or more outputs 18. By way of example, in complex processes found in industry, many such inputs may be utilized, including feedstocks, raw materials, electrical energy, fuels, parts, assemblies and sub-assemblies, and so forth. The outputs 18 may include finished products, semi-finished products, assemblies, manufacturing products, byproducts, and so forth. Based upon the system dynamics, the physics of the system and similar factors, the control system 12, may regulate operations of the process system 10 in order to control both the production of the outputs 18 as well as quality of the outputs 18, and so forth.

In the illustrated embodiment, the control system 12 may perform control functions 22 in response to process information 20 received from the process system 10. For instance, the process information 20 may be provided by one or more sensors 24 configured to detect and/or measure certain parameters of the process system 10. In general, such sensors 24 may include measurement devices, transducers, and the like that may produce discrete or analog signals and values representative of various variables of the process system 10. The sensors 24 may be coupled to the one or more controllers 14 of the control system 12, which in turn controls actuators (e.g., valve actuators, pump actuators, and so forth) 26 of the process system 10 that can be used to manipulate the process system 10. In practice, many such sensors 24 and more than one controller 14 may be provided in the control system 12. Such sensors 24 commonly produce voltage or current outputs that are representative of the sensed variables. The process information 20 may represent "on-process" measurements of various parameters obtained directly from the process (e.g., using the sensors 24). As used herein, the terms "on-process measurements" or "online measurements" or the like shall be understood to refer to measurements of process parameters acquired directly from the process system 10. Additionally, the process information 20 may also include controllable and external operating constraints, as well as user-specified set points. Such constraints may be received from a laboratory testing facility 28 and may include laboratory measurements 30 for use as reference data or setpoints.

Figure 2:
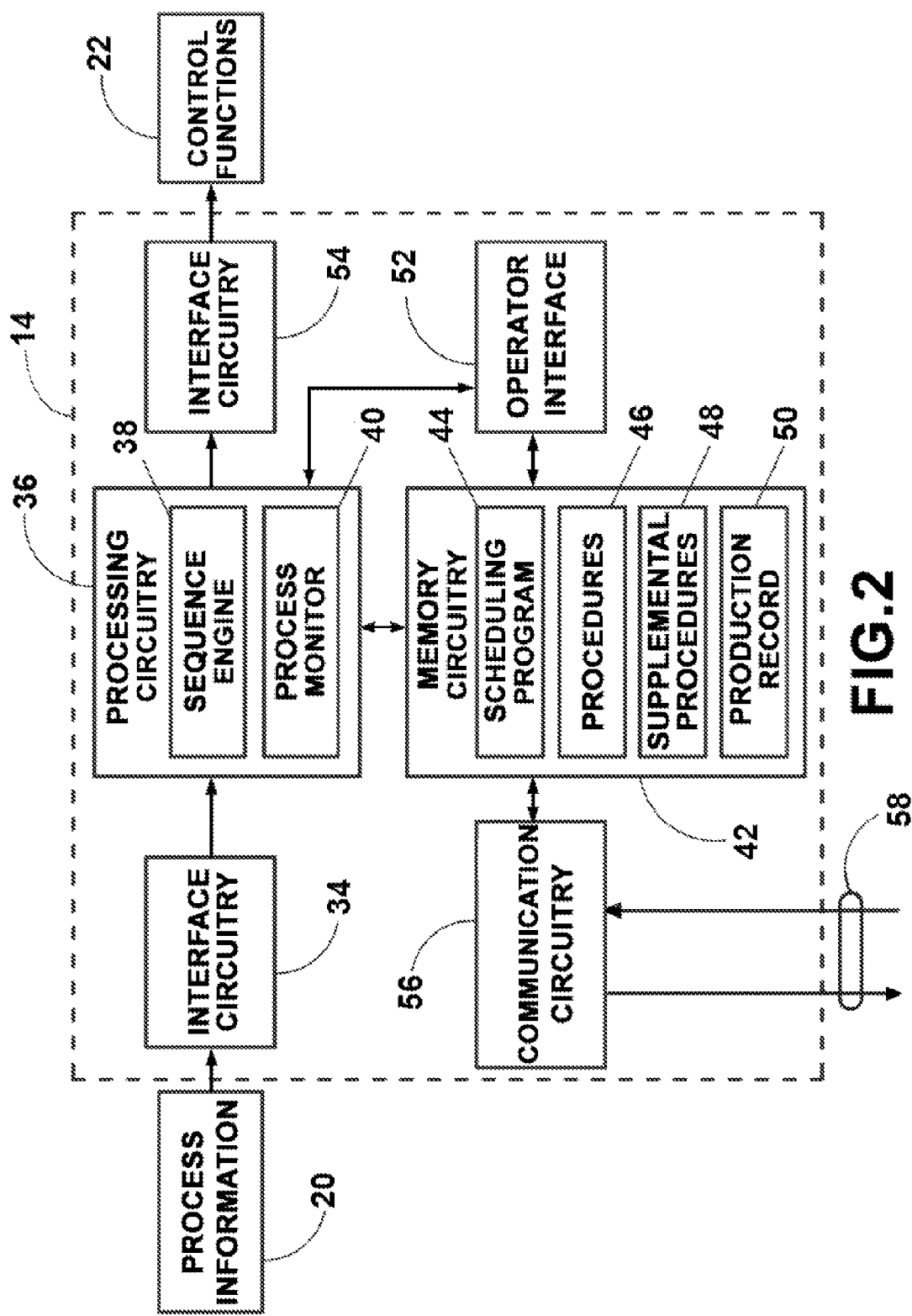
FIG. 2 is a diagrammatical representation of certain functional components that may be included in a controller in accordance with an embodiment of the present technique.

FIG. 2 illustrates certain exemplary components that may be included in a controller 14 of the type illustrated in FIG. 1, which may be configured to implement various supplemental procedures in response to process changes, as described in detail below. Many other components may be included in the controller 14 depending upon the system design, the type of system controlled, the system control requirements, and so forth. In the illustrated embodiment, interface circuitry 34 receives process information 20, which, as discussed above, may include values or signals obtained using the sensors 24. The interface circuitry 34 may include filtering circuitry, analog-to-digital conversion circuitry, and so forth. The interface circuitry 34 is in data communication with processing circuitry 36, which may include any suitable processor, such as a microprocessor, a field programmable gate array, and so forth. The processing circuitry 36 may carry out control functions and, in the present embodiment, may execute various supplemental procedures in response to process changes. By way of example, the processing circuitry 36 may include a sequence engine processor 38 and/or a process monitor processor 40. The sequence engine processor 38 may execute one or more procedural sequences, which may be a series of instructions or steps used to produce the products 18. Examples of procedural sequences, or procedures, include sequences of process automation control programs, manual instructions, software modules, and so forth. The process monitor processor 40 may initiate specified supplemental procedural sequences, or supplemental procedures, when certain conditions, such as process changes, trigger actions to be performed. Although the processing circuitry 36 is shown disposed in the process controller 14, in other embodiments the processing circuitry 36 may be disposed in a tablet, a workstation, a cloud-based virtual device, a computing device, or any combination thereof.

The processing circuitry 36 is also in data communication with memory circuitry 42, which may include one or more memory modules that store control routines to be executed by the processing circuitry 36, as well as store certain desired variables, variable settings, set points, and so forth, as will be appreciated by those skilled in the art. For example, the memory circuitry 42 may include a scheduling program module 44, a procedures module 46, a supplemental procedures module 48, and/or a production record module 50. The scheduling program module 44 may include instructions for initiating one or more procedural sequences based on a predetermined schedule. The procedures module 46 may include instructions for the one or more procedural sequences to be executed by the sequence engine 38. In further embodiments, the procedures module 46 may include instructions for a sequence of process automation control programs, a sequence of manual instructions, a sequence of software modules, or a combination thereof. The supplemental procedures module 48 may include instructions for one or more supplemental procedural sequences to be executed by the sequence engine 38 in response to process information 20, for example. In further embodiments, the supplemental procedures module 48 may include instructions for a sequence of process automation control programs, a sequence of manual instructions, a sequence of software modules, or a combination thereof. In certain embodiments, the supplemental procedures module 48 may include instructions for exception handling separate from the procedures module 46. Exception handling may refer to instructions configured to handle the occurrence of exceptions, or special conditions that change the normal flow of program execution. Thus, the supplemental procedures module 48 may be able to handle exceptions without relying on exception handling from the procedures module 46. The production record module 50 may include instructions for storing data associated with executed procedural sequences and supplemental procedural sequences in a production record.

Both the processing circuitry 36 and the memory circuitry 42 may be in data communication with an operator interface 52, which may enable an operator to provide input or instructions to the controller 14. In certain embodiments, the operator interface 52 may include a display. For example, the operator may use the operator interface 52 to view data, output, statuses, and other information regarding the controller 14. In addition, the processing circuitry 36, based upon the modules of the memory circuitry 42, may output signals to interface circuitry 54 that may be used to drive the actuators 26 of the process system 10 of FIG. 1. The interface circuitry 44 may include various driver circuits, amplification circuits, digital-to-analog conversion circuitry, and so forth. That is, based upon the process information 20 received, the controller 14 may determine appropriate control actions or outputs based on the variable relationships, constraints, and/or objectives defined by the memory circuitry 42.

The controller 14 may also include communications interface circuitry 56. By way of example, the communications interface circuitry 56 may include networking circuitry 58 configured to network the controller 14 with other controllers that may be implemented in the control system 12, as well as with remote monitoring and control systems, for instance. Further, the communications interface circuitry 56 may also network the controller 14 with the laboratory testing facility 28 as shown in FIG. 1 for receiving laboratory data 30 representing the measurements of certain process parameters. Particularly, these laboratory measurements 30 may represent the measured values of parameters not directly measurable during the period in which the product 18 is being produced by the process system 10, and may be obtained or measured by performing one or more testing procedures on a sample of the finished product 18. While this component has been referred to herein as a "laboratory testing facility" for purposes of the present discussion, it should be understood that the offline testing arrangement represented by the reference numeral 28 may include any conceivable type of testing arrangement capable of obtaining and providing off-process measurements of process parameters, including automated or dedicated testing equipment, offline sensors, to name just a few. As used herein, the terms "off-process measurements" or "offline measurements" or the like shall be understood to refer to measurements of process parameters acquired in such settings that are separate from the process system 10.

Figure 3:
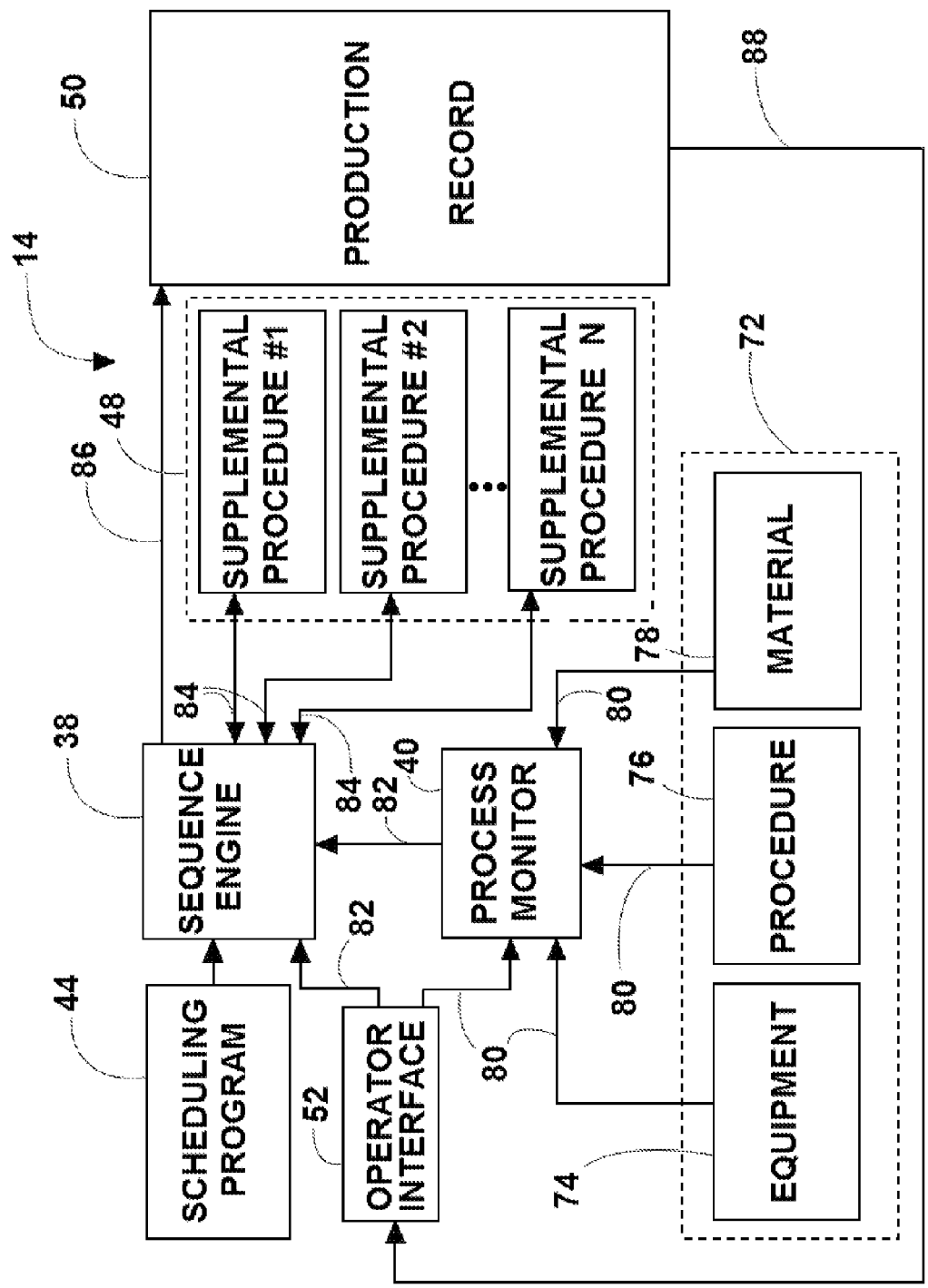
FIG. 3 is a diagrammatical representation of a process controller in accordance with an embodiment of the present technique.

FIG. 3 is a block diagram of an embodiment of the process controller 14 illustrating relationships between various components. Specifically, FIG. 3 shows how changes in the process result in generation of process-initiated supplemental workflows or procedures. Elements in FIG. 3 in common with those shown in FIGS. 1 and 2 are labeled with the same reference numerals. As shown in FIG. 3, the process monitor 40 may receive input indicative of a status of a process feature 72. For example, the process feature 72 may include one or more pieces of equipment 74 of the process system 10, and the status of the equipment 74 may include an operational state, temperature, pressure, flow rate, power consumption, availability, maintenance status, or any combination thereof. In addition, the process feature 72 may include a procedure step 76, which may be a step of one or more procedural sequences and/or supplemental procedural sequences being executed by one or more of the process controllers 14 of the process system 10, and the status of the procedure step 76 may include an identification, state, and/or attribute of the procedure step 76. Specifically, the status of the procedure step 76 may indicate whether the procedure step 76 is ready to start, running, halted, stopped, or any combination thereof. The process feature 72 may also include a material 78, which may be any material, ingredient, or component used by the process system 10. For example, the status of the material 78 may include a mass, volume, temperature, pressure, strength, concentration, age, history, or any combination thereof. One or more of the equipment 74, procedure 76, and/or material 78 of the process feature 72 may generate an input electronic signal 80 that is sent to the process monitor 40. In certain embodiments, the process feature 72 may include one or more sensors 24 that generate the input electronic signal 80 indicative of the status of the process feature 72. In general, the input electronic signal 80 may carry information corresponding to the process information 20. In certain embodiments, the operator may send the input electronic signal 80 to the process monitor 40 via the operator interface 52. In such embodiments, sensors 24 may be unavailable to send the input electronic signal 80 directly to the process monitor 40. For example, the input electronic signal 80 generated by the operator may correspond to laboratory data 30.

The process monitor 40 shown in FIG. 3 may apply logic based on the input electronic signal 80. Such logic may be used to change or modify the procedure being executed by the sequence engine 38 via an output electronic signal 82. For example, the status of the equipment 74 may indicate unavailability of a piece of equipment. The logic performed by the process monitor 40 may direct the sequence engine 38 to swap to a spare piece of equipment. By further example, the status of the material 78 may indicate unavailability of an ingredient. The logic performed by the process monitor 40 may direct the sequence engine 38 to use an alternative ingredient. Specifically, the process monitor 40 may generate the output electronic signal 82 in response to the input electronic signal 80. The sequence engine 38 may then receive the output electronic signal 82. In certain embodiments, the operator may send the output electronic signal 82 directly to the sequence engine 38 via the operator interface 52. For example, the operator may be aware of a change in a process feature 72 that is not sent to the process monitor 40 via the input electronic signal 80.

As described above, the sequence engine 38 may execute the one or more procedures stored in the procedures module 46 of the memory circuitry 42. In addition, the sequence engine 38 applies logic based on the output electronic signal 82 from the process monitor 40. Specifically, the logic may direct the sequence engine 38 to select one or more of the supplemental procedures stored in the supplemental procedures module 48 based on the received output electronic signal 82. As shown in FIG. 3, the supplemental procedures module 48 may include up to N supplemental procedures. In response to the received output electronic signal 82, the sequence engine 38 may generate commands 84 to receive and execute the selected one or more of the N supplemental procedures stored in the supplemental procedures module 48. For example, one of the N supplemental procedures may include instructions for the sequence engine 38 to swap from an unavailable piece of equipment to a spare piece of equipment. By further example, another supplemental procedure may include instructions to direct the sequence engine 38 to use an alternative ingredient when a primary ingredient is unavailable. Thus, changes in the process result in the selection of process-initiated supplemental procedures. In certain embodiments, the sequence engine 38 may generate commands 84 to execute two or more of the N supplemental procedures stored in the supplemental procedures module 48 in parallel.

Execution by the sequence engine 38 of the procedures stored in the procedures module 46 and the supplemental procedures stored in the supplemental procedures module 48 may generate data 86 that is sent to the production record 50. In certain embodiments, the data 86 may include time values corresponding to when steps or instructions of the procedures and/or supplemental procedures were executed by the sequence engine 38. In other embodiments, the data 86 may include values of process variables, alarms, messages, and so forth, which also may include time values corresponding to when the events occurred. Output 88 from the production record 50 may be made available to the operator via the operator interface 52. For example, the operator may be able to view the steps of the procedures and/or supplemental procedures via the operator interface 52. In addition, the data 86 may be sorted based on the time values associated with the data 86. Thus, although the sequence engine 38 may execute steps from one or more different procedures and/or supplemental procedures, sorting of the data 86 based on time values enables the production record 50 to provide a continuous contextual thread of the steps and other events associated with the process system 10.

Figure 4:
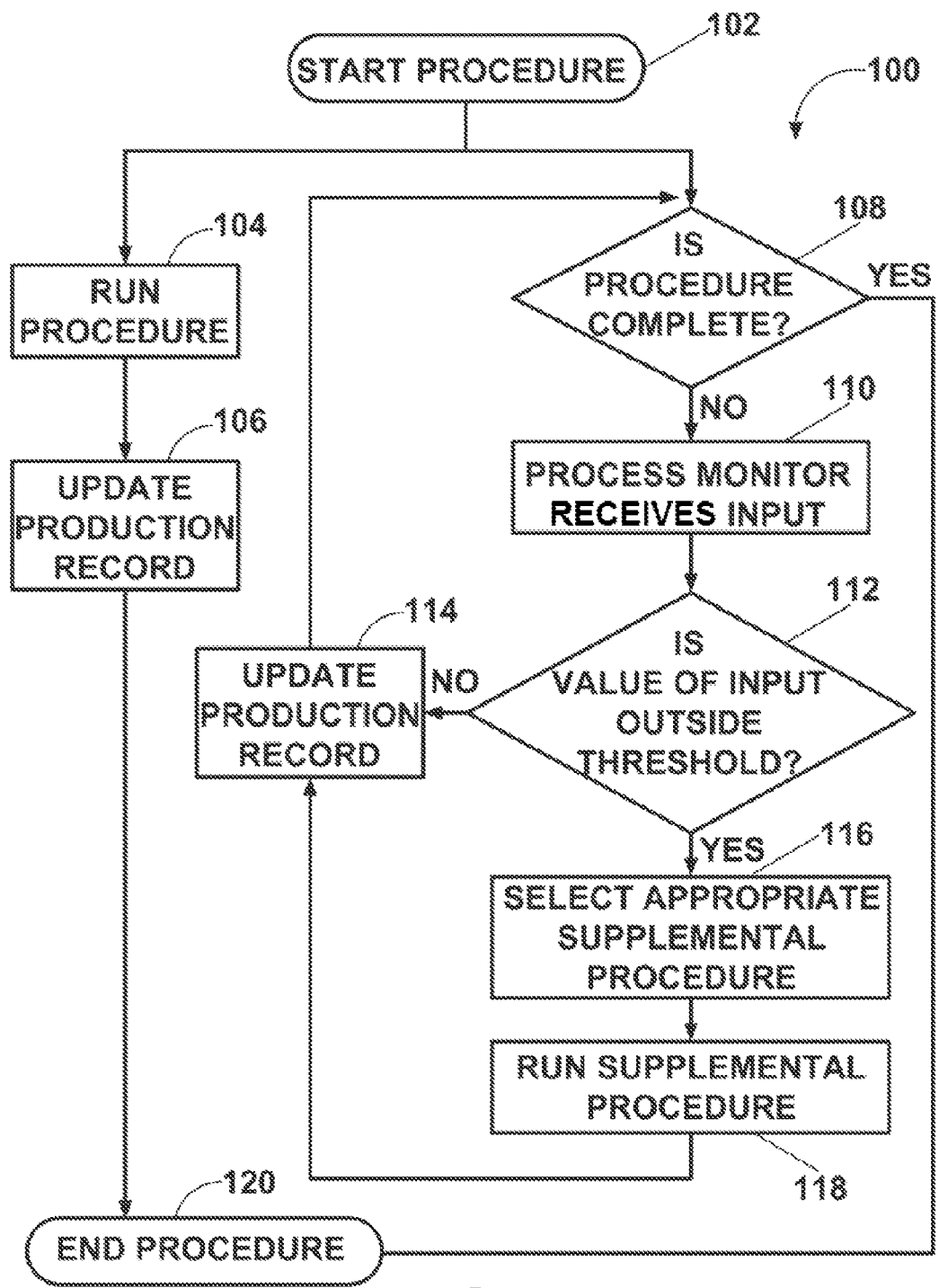
FIG. 4 is a flow chart of a process for operating an embodiment of a process controller in accordance with an embodiment of the present technique.

FIG. 4 is a flow chart of a process 100 that may be performed by the process controller 14 to select supplemental procedures based on process changes. An embodiment of the invention may be embodied in the form of computer-implemented processes and apparatuses for practicing those processes. Embodiments of the present invention may also be embodied in the form of a computer program product having computer program code containing executable instructions embodied in non-transitory tangible, machine-readable media, such as floppy diskettes, CD-ROMs, hard drives, USB (universal serial bus) drives, or any other tangible computer readable storage medium, wherein, when the computer program code is loaded into and executed by a computer, the computer becomes an apparatus for practicing embodiments of the invention. Embodiments of the invention also may be embodied in the form of computer program code, for example, whether stored in a storage medium or loaded into and/or executed by a computer, wherein when the computer program code is stored in and executed by a computer, the computer becomes an apparatus for practicing embodiments of the invention. When implemented on a general-purpose processor, the computer program code segments configure the processor to create specific logic circuits.

Specifically, the process 100 may include computer code disposed on a non-transitory computer-readable storage medium or a process controller that includes such a non-transitory computer-readable storage medium. The computer code may include instructions for the sequence engine 38 to execute one or more procedures stored in the procedures module 46. In further embodiments, the code may include instructions for the sequence engine 38 to select and execute one or more supplemental procedures stored in the supplemental procedures module 48 based at least in part on the input electronic signal 80 sent to the process monitor 40. The input electronic signal 80 may indicate a change in the status of one or more process features 72.

Returning to FIG. 4, in a step 102, the sequence engine 38 begins executing the procedure stored in the procedures module 46. For example, the operator may initiate execution of the procedure using the operator interface 52. Alternatively, the scheduling program 44 may start the procedure. In a step 104, the sequence engine 38 executes the various steps of the procedure. As each step of the procedure completes, the sequence engine 38 sends the data 86 to update the production record 50 in step 106. In parallel with the steps 104 and 106, the sequence engine 38 determines whether the procedure is complete in a step 108. If the procedure is not complete, in a step 110, the process monitor 40 receives the input electronic signals 80 from the process feature 72. In a step 112, the process monitor 40 applies logic based on the input electronic signal 80. For example, the process monitor 40 may determine whether a value of the input electronic signal 80 is outside a threshold, such as determining whether a piece of equipment is operating outside a temperature threshold. By further example, the process monitor 40 may determine that an ingredient is outside a minimum inventory threshold. If the value of the input electronic signal 80 is not outside of the threshold, the sequence engine 38 sends the data 86 to update the production record 50 in a step 114. The process 100 then returns to the step 108. Returning to the step 112, if the value of the input electronic signal 80 is outside of the threshold, the sequence engine 38 applies logic to the output electronic signal 82 to select an appropriate supplemental procedure stored in the supplemental procedures module 48 in a step 116. In a step 118, the sequence engine 38 sends the command 84 to receive and execute the selected supplemental procedure. In certain embodiments, the supplemental procedure may include logic or intelligence to determine whether to execute or not based on a status of one or more specified criteria associated with the supplemental procedure. For example, the specified criterion may include a maintenance flag or other signal. If the status of the maintenance flag is clear, then the supplemental procedure may be enabled to execute and if the flag is not clear, then the supplemental procedure may be prevented from executing. As another example, the specified criterion may include the number of instances of the supplemental procedure that are running. If the number of instances is greater than one, additional instances of the supplemental procedure may be prevented from running. In further embodiments, the threshold may include similar logic or intelligence to determine whether to execute the supplemental procedure or not based a status of a specified criterion associated with the threshold. Thus, use of such specified criteria may help prevent a cycling situation in which a threshold is exceeded, a condition changes, and the threshold is exceeded again. After the supplemental procedure is complete, the sequence engine 38 sends the data 86 associated with execution of the supplemental procedure to update the production record 50 in the step 114. The process 100 then returns to the step 108. If the value of the input electronic signal 80 is still outside of the threshold in the step 112, the supplemental procedure may execute again. However, in certain embodiments, the specified criteria associated with the supplemental procedure and/or threshold may not enable the supplemental procedure to execute. Instead, the maintenance flag or other signal may prompt an operator to investigate why the supplemental procedure is not having a desired effect. Thus, in certain embodiments, the supplemental procedure is not executed every time the input electronic signal 80 is outside of the threshold. Returning to the step 108, if it is determined that the procedure has reached its final step, the process enters a step 120 to end the procedure.

Figure 5:
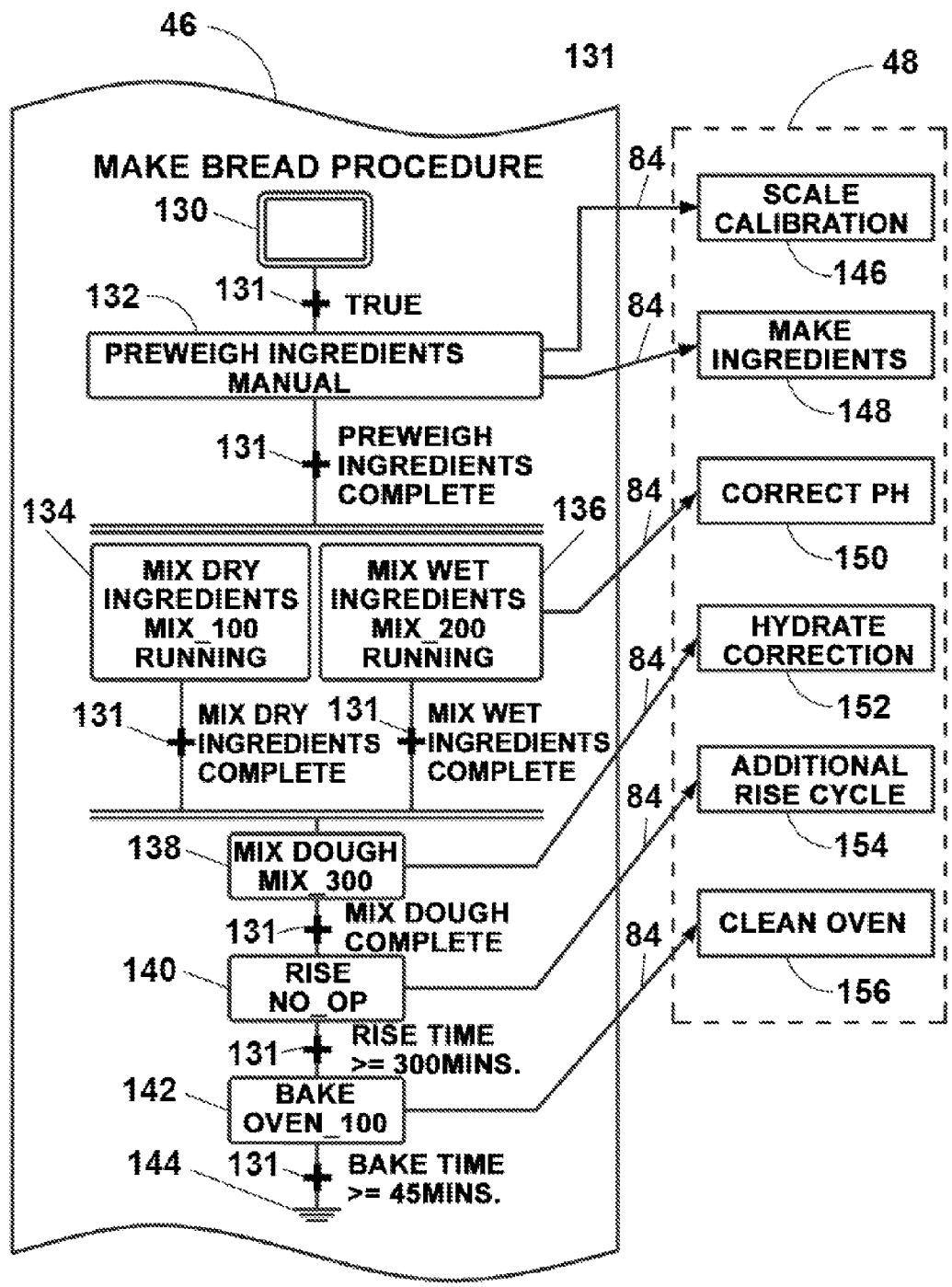
FIG. 5 is a block diagram of a procedure and a plurality of supplemental procedures in accordance with an embodiment of the present technique.

FIG. 5 is a block diagram of the relationships between the procedure and plurality of supplemental procedures that may be used in making bread. The make bread procedure may be stored in the procedures module 46 and the plurality of supplemental procedures may be stored in the supplemental procedures module 48. The process of making bread using these procedures is a non-limiting example that is illustrative of present embodiments. The various steps of the procedure and the plurality of supplemental procedures may be executed by the sequence engine 38 as described above. As shown in FIG. 5, the make bread procedure is represented using a sequential function chart. The procedure begins with an initial step 130. After the initial step 130, a transition 131, represented by a cross-shaped symbol in FIG. 5, fires and a pre-weigh ingredients step 132 becomes active. It should be noted that the term "fires" may refer to the transition 131 becoming a true condition. In the step 132, the various ingredients used to make bread are weighed. After the ingredients have been pre-weighed, the transition 131 following the step 132 fires and steps 134 and 136 become active. Specifically, the dry ingredients are mixed in the step 134 and the wet ingredients are mixed in the step 136. After both the dry ingredients and the wet ingredients are mixed, the transitions 131 following steps 134 and 136 fire and a step 138 becomes active. In the step 138, the dry ingredients and the wet ingredients are mixed together to form a dough. After mixing of the dough is complete, the transition 131 following the step 138 fires and a step 140 becomes active. In the step 140, the dough is allowed to rise for a specified period, such as greater than 300 minutes as shown in FIG. 5. After the specified period has elapsed, the transition 131 following the step 140 fires and a step 142 becomes active. In the step 142, the dough is baked in an oven for a specified period, such as greater than 45 minutes as shown in FIG. 5.

After the specified period has elapsed, the transition 131 following the step 142 fires and a sequence terminator 144 becomes active to end the make bread procedure.

As described above, the one or more supplemental procedures stored in the supplemental procedures module 48 shown in FIG. 5 may be executed by the sequence engine 38 via the commands 84. The logic of the sequence engine 38 may select the one or more supplemental procedures based at least on what step the make bread procedure is in. For example, the commands 84 are shown in FIG. 5 linking the steps of the procedure with the appropriate supplemental procedures. In other words, the sequence engine 38 may select a particular supplemental procedure to be executed depending on which step of the procedure is being executed by the sequence engine 38. For example, if the procedure is in the step 132, either a scale calibration supplemental procedure 146 or a make ingredients supplemental procedure 148 may be executed. Similarly, if the procedure is in the step 136, a correct pH supplemental procedure 150 may be executed. If the procedure is in the step 138, a hydrate correction supplemental procedure 152 may be executed. If the procedure is in the step 140, an additional rise cycle 154 supplemental procedure may be executed. If the procedure is in the step 142, a clean oven supplemental procedure 156 may be executed. The supplemental procedures 146, 148, 150, 152, 154, and 156 are described in further detail below.

For example, during the pre-weigh ingredients step 132, the process monitor 40 may receive the input electronic signal 80 from the equipment 74 indicating the status of a scale used during the pre-weigh ingredients step 132. The input electronic signal 80 from the scale may indicate that the scale is to be calibrated using the scale calibration supplemental procedure 146. Thus, the sequence engine 38 may generate the command 84 to the scale calibration supplemental procedure 146 to calibrate the scale to enable the make bread procedure to continue. Similarly, during the pre-weigh ingredients step 132, the process monitor 40 may receive the input electronic signal 80 from the material 78 indicating a low inventory of one or more ingredients. Thus, the sequence engine 38 may generate the command 84 to the make ingredients supplemental procedure 148 to produce additional ingredients to enable the procedure to continue. In the mix wet ingredients step 136, the process monitor 40 may receive the input electronic signal 80 from the material 78 indicating a pH of the wet ingredients outside of a threshold. Thus, the sequence engine 38 may generate the command 84 to the correct pH supplemental procedure 150 to add additional material to bring the pH of the wet ingredients within the threshold. With the scale calibration, make ingredients, and correct pH supplemental procedures 146, 148 and 150, the procedure halts and the supplemental procedure 146, 148, and/or 150 completes before the procedure resumes.

During the mix dough step 138 shown in FIG. 5, the process monitor 40 may receive the input electronic signal 80 from the materials 78 indicating that a hydration of the dough is outside a threshold. The sequence engine 38 may generate the command 84 to execute the hydrate correction supplemental procedure 152, which may replace the step 138 of the make bread procedure. In other words, the hydrate correction supplemental procedure 152 may include steps to bring the hydration of the dough within the threshold, and to complete the mixing of the dough. Once mixing of the dough is complete, the hydrate correction supplemental procedure 152 will cause the transition 131 after step 138 to fire and activate step 140. Similarly, the process monitor 40 may receive the input electronic signal 80 from the materials 78 indicating that the dough requires additional rise time. Thus, the sequence engine 38 may generate the command 84 to execute the additional rise cycle 154, which may replace the rise step 140. After the dough rises for the additional period specified in the additional rise supplemental procedure 154, the transition 131 following the step 140 fires and the step 142 becomes active. During the bake step 142, the process monitor 40 may receive the input electronic signal 80 from the equipment 74 indicating the amount of time the oven has been used since the oven was last cleaned. In response to the output electronic signal 82, the sequence engine 38 may generate the command 84 to execute the clean oven supplemental procedure 156 if the amount of time the oven has been used exceeds a threshold. The clean oven step 156 may be executed after the bake bread procedure reaches the sequence terminator 144 indicating that the current batch of bread is complete.

Figure 6:
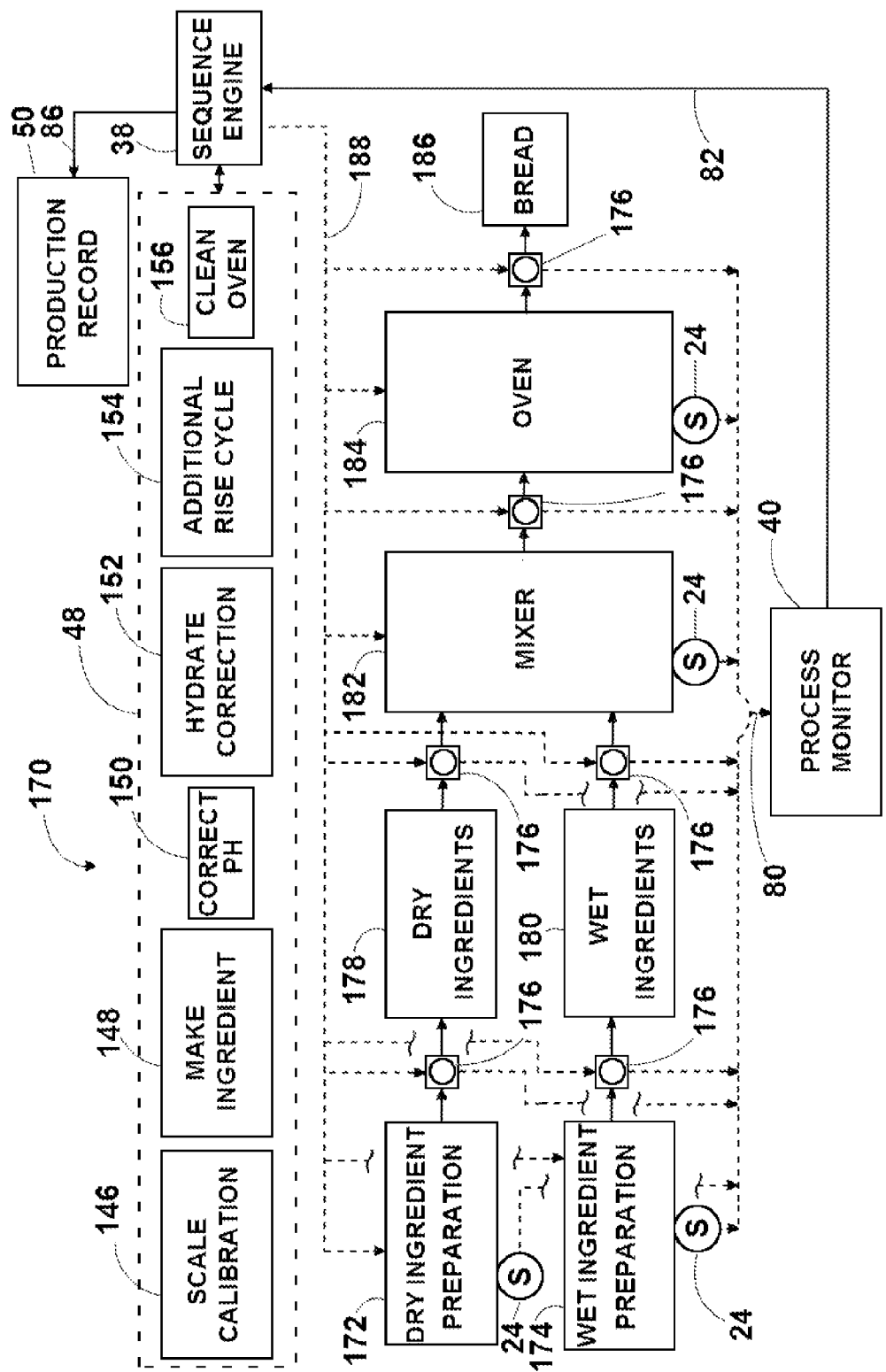
FIG. 6 is a block diagram of an embodiment of a process controller and equipment controlled by the process controller in accordance with an embodiment of the present technique.

FIG. 6 is a block diagram of a system 170 that includes equipment that may be controlled by an embodiment of the process controller 14 to produce bread. This system is a non-limiting example of a system that is illustrative of present embodiments. Specifically, the dry ingredients may be prepared in a dry ingredient preparation system 172. Similarly, the wet ingredients may be prepared in a wet ingredient preparation system 174. A flow control element 176 may be used to transfer the dry ingredients prepared in the dry ingredient preparation system 172 to dry ingredient storage 178. Similarly, the flow control element 176 may be used to transfer the wet ingredients from the wet ingredient preparation system 174 to wet ingredient storage 180. The flow control element 176 may include, but is not limited to, control valves, pumps, conveyors, extruders, blowers, slide valves, hopper valves, or any combination thereof. Next, the flow control element 176 may transfer the dry and wet ingredients from dry and wet storage 178 and 180 to a mixer 182. Specifically, the dough may be formed by mixing the wet and dry ingredients in the mixer 182. In certain embodiments, the flow control element 176 may be used to transfer the dough from the mixer 182 to an oven 184 to bake the dough into bread 186. The flow control element 176 may be used to transfer the bread 186 out of the oven 184.

As shown in FIG. 5, the sequence engine 38 may transmit one or more control signals 188 to the various pieces of equipment of the system 170 based on which of the supplemental procedures stored in the supplemental procedures module 48 the sequence engine 38 is executing. For example, if the sequence engine 38 is executing the scale calibration supplemental procedure 146, the engine 38 may send the control signal 188 to the scales used in the dry and/or wet ingredient preparation systems 172 and 174. Similarly, if the sequence engine 38 is executing the make ingredient supplemental procedure 148, the engine 38 may send the control signal 188 to ingredient preparation equipment in the dry and/or wet ingredient preparation systems 172 and 174. If the sequence engine 38 is executing the correct pH supplemental procedure 150, the engine 38 may send the control signal 188 to ingredient preparation equipment in the wet ingredient preparation system 174. If the sequence engine 38 is executing the hydrate correction supplemental procedure 152, the engine 38 may send the control signal 188 to one or more of the flow control elements 176 to add additional dry ingredients 178 and/or wet ingredients 180 to the mixer 182 to adjust the hydration of the dough. If the sequence engine 38 is executing the additional rise cycle supplemental procedure 154, the engine 38 may send the control signal 188 to the mixer 182 and/or the flow control element 176 to keep the dough in the mixer 182 for an additional period before being transferred to the oven 184. If the sequence engine 38 is executing the clean oven supplemental procedure 156, the engine 38 may send the control signal 188 to the oven 184 to perform cleaning of the oven 184. Thus, in various embodiments, the sequence engine 38 may send the control signals 188 to the appropriate equipment of the process 170 based on which of the supplemental procedures the engine 38 is executing. In addition, the system 170 may include one or more sensors 24. For example, the sensors 24 may generate input electronic signals 80 indicative of a status of the process feature 72, such as temperature, pressure, flow rate, mass, volume, strength, concentration, age, history, step being executed, or any combination thereof. As shown in FIG. 6, the dry and wet ingredient preparation systems 172 and 174, the mixer 182, and the oven 184 may include the sensors 24. The sensors 24 shown in FIG. 6 may generate the input electronic signals 80 sent to the process monitor 40, which includes logic to determine the output electronic signal 82 to send to the sequence engine 38. Based on the output electronic signal 82, the sequence engine 38 includes logic to determine the command 84 to select the one or more appropriate supplemental procedures stored in the supplemental procedures module 48. Thus, changes in the system 170 as indicated by the input electronic signals 80 may result in the selection and execution of appropriate supplemental procedures, thereby making the selected supplemental procedures process-initiated workflows.

Figure 7:
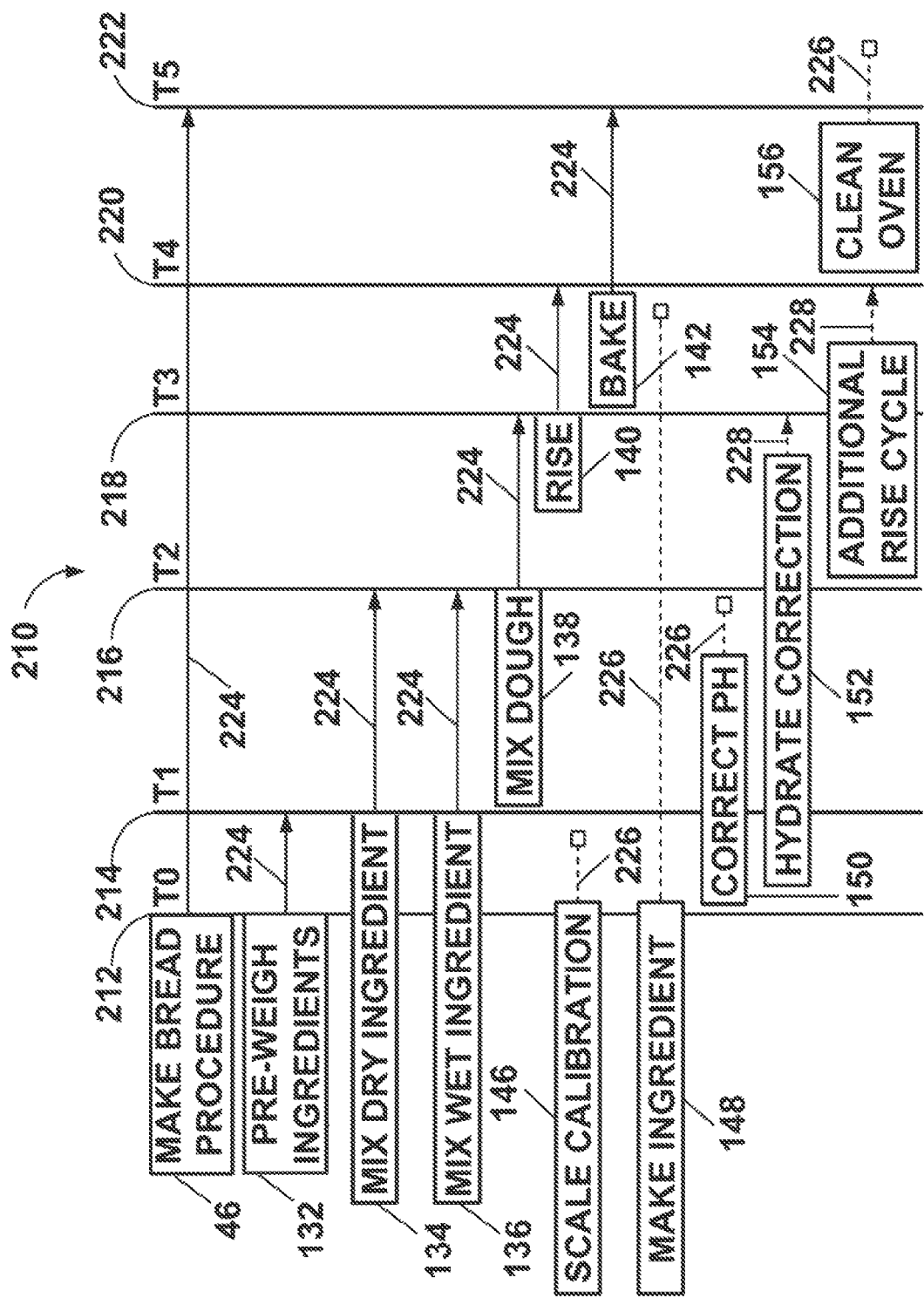
FIG. 7 is a timing diagram for a procedure and a plurality of supplemental procedures in accordance with an embodiment of the present technique.

FIG. 7 is a timing diagram 210 for the procedures and supplemental procedures used in making bread, as described in detail above. This timing diagram is a non-limiting example of a timing diagram that is illustrative of present embodiments. Specifically, the timing diagram 210 shows the order and durations of the steps of procedures and supplemental procedures that may be used during the course of making one batch of bread 186. As shown in FIG. 7, time increases from left to right in the timing diagram 210. Specifically, the batch begins at an initial time 212 and ends at a fifth time 222. Thus, the make bread procedure stored in the procedures module 46 begins at the initial time 212 and ends at the fifth time 222, as represented by an arrow 224 that indicates the normal execution of the procedure. The pre-weigh ingredients step 132 of the procedure may run from the initial time 212 to a first time 214, as indicated by the normal execution arrow 224. The mix dry ingredients step 134 and the mix wet ingredients step 136 may run from the first time 214 to a second time 216, as indicated by normal execution arrows 224. The mix dough step 138 may run from the second time 216 to a third time 218, as indicated by the normal execution arrow 224. The rise step 140 may run from the third time 218 to a fourth time 220, as indicated by the normal execution arrow 224. Finally, the bake step 142 may run from the fourth time 220 to the fifth time 222, as indicated by the normal execution arrow 224.

Turning next to the supplemental procedures shown in FIG. 7, the scale calibration supplemental procedure 146 may be executed at any point between the initial time 212 and the first time 214, as indicated by the process-initiated line 226. As described above, the scale calibration supplemental procedure 146 interrupts the procedure. In other words, the sequence engine 38 does not proceed with the pre-weigh ingredients step 132 until the scale calibration supplemental procedure 146 is complete, which may be indicated by the transfer of data 86 to the production record 50. The make ingredient supplemental procedure 148 may be executed at any point between the initial time 212 and the fourth time 220, as indicated by the process-initiated line 226. The correct pH supplemental procedure 226 may run between the first time 214 and the second time 216, as indicated by the process-initiated line 226. Both the make ingredient and the correct pH supplemental procedures 148 and 150 may interrupt the procedure, which means that the supplemental procedures 148 and 150 are completed before the procedure resumes. The hydrate correction supplemental procedure 152 may run between the second time 216 and the third time 218. The hydrate correction supplemental procedure 152 replaces the mix dough step 138 of the procedure, as indicated by the process-initiated arrow 228. In other words, after the sequence engine 38 executes the hydrate correction supplemental procedure 152, the engine 38 proceeds to the next step of the procedure, namely the rise step 140. The additional rise cycle supplemental procedure 154 may run between the third time 218 and the fourth time 220. The additional rise cycle supplemental procedure 154 replaces the rise step 140 of the procedure, as indicated by the process-initiated arrow 228. Finally, the clean oven supplemental procedure 156 may run after the fifth time 222, as indicated by the process-initiated line 226. Thus, the clean oven supplemental procedure 156 completes before the sequence engine 38 executes the procedure to make another batch of bread 186. Thus, the timing diagram 210 shows an example of how the various process-initiated supplemental procedures may be executed by the sequence engine 38 during the course of executing the procedure. In various embodiments, the process-initiated supplemental procedures may interrupt the procedure, replace the procedure with the supplemental procedure, operate in parallel with the procedure, or any combination thereof.

Figure 8:
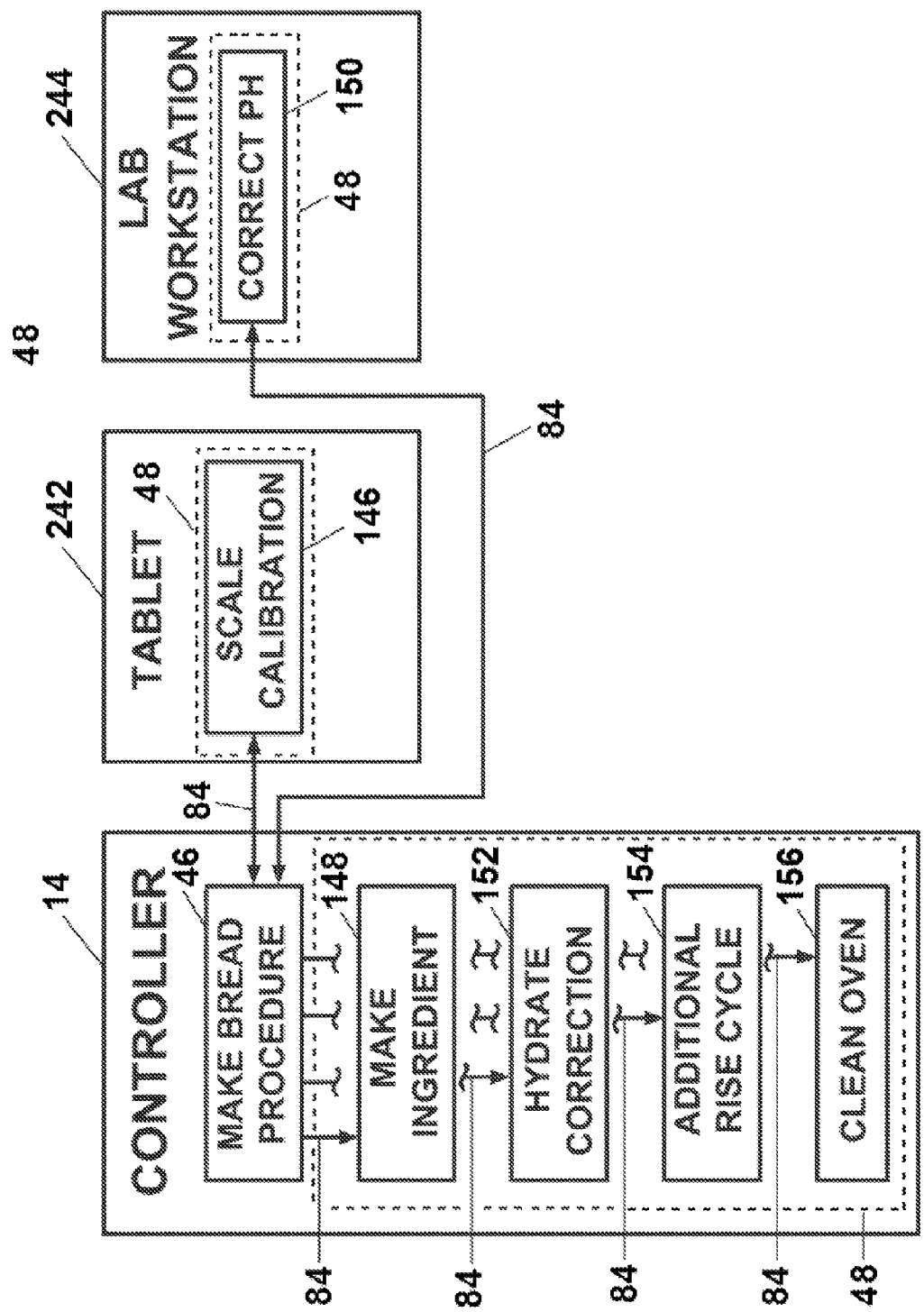
FIG. 8 is a block diagram of equipment that includes a plurality of supplemental procedures in accordance with an embodiment of the present technique.

FIG. 8 is a block diagram of equipment that may include the procedures module 46 and the supplemental procedures module 48 for making bread 186. Specifically, the supplemental procedures module 48 may be located in more than one device. For example, the make ingredient supplement procedure 148, hydrate correction supplemental procedure 152, additional rise cycle supplemental procedure 154, and the clean oven supplemental procedure 156 may be located in the supplemental procedures module 48 within the process controller 14, which may be located within or adjacent to a control room of the bread-making facility. The procedures module 46 may also be located within the process controller 14. The scale calibration supplemental procedure 146 may be may be located in the supplemental procedures module 48 within a tablet 242. For example, the tablet 242 may be a hand-held device used by an operator or maintenance technician to perform the calibration of the scale. In certain embodiments, the tablet 242 may communicate wirelessly with the process controller 14. Thus, the sequence engine 38 may send the command 84 wirelessly to the tablet 242. Subsequently, the tablet 242 may display the instructions for the calibration of the scale associated with the scale calibration supplemental procedure 146 to enable the operator or maintenance technician to calibrate the scale. After the calibration is complete, the tablet 242 may communicate wirelessly with the process controller 14 to update the production record 50 with data 86 associated with the scale calibration. The sequence engine 38 may then proceed with the execution of the procedure. In further embodiments, the correct pH supplemental procedure 150 may be located in the supplemental procedures module 48 within a laboratory workstation 244. For example, the laboratory workstation 244 may be a desktop device located in a laboratory and connected to the process controller 14. The sequence engine 38 may send the command 84 to the laboratory workstation 244. Subsequently, the laboratory workstation 244 may display the instructions for correcting the pH of the wet ingredients associated with the correct pH supplemental procedure 150. A lab technician may carry out the instructions displayed on the laboratory workstation 244. After correcting the pH of the wet ingredients, the lab technician may use the laboratory workstation 244 to update the production record 50 with data 86 associated with correcting the pH, enabling the sequence engine 38 to proceed with the execution of the procedure. In other embodiments, other equipment and devices associated with process control systems may be used in a variety of configurations to execute the procedure and process-initiated supplemental procedures to respond to changes in the process.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A process controller, comprising:
   memory circuitry, comprising:
      a procedure module comprising instructions for executing a procedure,
      a plurality of supplemental procedure modules, each of the plurality of supplemental procedure modules comprising instructions for executing one of a plurality of supplemental procedures, and
      a production record configured to store data generated from an execution of the procedure module and one or more of the plurality of supplemental procedure modules; and
   processing circuitry, comprising:
      a process monitor processor configured to receive an input electronic signal indicative of a status of a process feature, apply logic based on the input electronic signal, and generate an output electronic signal in response to the input electronic signal, and
      a sequence engine processor configured to execute the procedure module, receive the output electronic signal, apply logic based on the output electronic signal, select one or more of the plurality of supplemental procedure modules based on the received output electronic signal, execute the selected one or more of the plurality of supplemental procedure modules, and update the production record with data generated from the execution of the procedure module and the selected one or more of the plurality of supplemental procedure modules.

2. The system of claim 1, wherein the process monitor processor is configured to compare the input electronic signal to a threshold and generate the output electronic signal if the input electronic signal is outside the threshold and based on a status of a specified criterion associated with the threshold.

3. The system of claim 1, wherein the process feature comprises a procedure step, a piece of equipment, a material, an ingredient, a component, or a combination thereof.

4. The system of claim 1, wherein the sequence engine processor is configured to execute the selected one or more of the plurality of supplemental procedure modules based on a status of a specified criterion associated with the selected one or more of the plurality of supplemental procedure modules.

5. The system of claim 1, wherein the sequence engine processor is configured to execute two or more of the plurality of supplemental procedure modules in parallel.

6. The system of claim 1, wherein the procedure module comprises a sequence of process automation control programs, a sequence of manual instructions, a sequence of software modules, or a combination thereof.

7. The system of claim 1, wherein each of the plurality of supplemental procedure modules comprises a sequence of process automation control programs, a sequence of manual instructions, a sequence of software modules, or a combination thereof.

8. The system of claim 1, wherein each supplemental procedure module of the plurality of supplemental procedure modules is configured to interrupt the execution of the procedure module, replace the procedure module with the supplemental procedure in the memory circuitry, execute in parallel with the procedure module, or a combination thereof.

9. The system of claim 1, wherein the processing circuitry is disposed in a controller, a tablet, a workstation, a cloud-based virtual device, a computing device, or a combination thereof.

10. The system of claim 1, wherein each of the plurality of supplemental procedure modules comprises instructions for exception handling separate from the procedure module.

11. The system of claim 1, wherein the data stored in the production record comprises time values corresponding to when the sequence engine processor executes the procedure module and the selected one or more of the plurality of supplemental procedure modules.

12. The system of claim 1, an operator interface device communicatively coupled to the memory circuitry and the processing circuitry, wherein the operator interface device is configured to provide the input electronic signal to the process monitor processor based on input received from an operator, select the procedure module for execution by the sequence engine processor based on input received from the operator, present the data stored in the production record, or a combination thereof.

13. The system of claim 1, wherein the memory circuitry comprises a scheduling program comprising instructions for the sequence engine processor to begin execution of the procedure module, and wherein the sequence engine processor is configured to execute the scheduling program first.

14. The system of claim 1, wherein the process controller comprises a batch process controller.

15. A program stored on a non-transitory computer readable storage medium, comprising:
   computer code disposed on the non-transitory computer readable storage medium, wherein the code comprises instructions for automating a process, the instructions comprising:
   instructions for transmitting an input electronic signal indicative of a status of a process feature to a process monitor processor;
   instructions for applying logic by the process monitor processor based on the input electronic signal;
   instructions for generating an output electronic signal from the process monitor processor in response to the input electronic signal;
   instructions for executing a procedure module by a sequence engine processor;
   instructions for transmitting the output electronic signal from the process monitor processor to the sequence engine processor;
   instructions for applying logic by the sequence engine processor based on the output electronic signal;
   instructions for selecting one or more of a plurality of supplemental procedure modules by the sequence engine processor based on the output electronic signal;
   instructions for executing the selected one or more of the plurality of supplemental procedure modules by the sequence engine processor; and
   instructions for updating a production record with data generated by executing the procedure module and the selected one or more of the plurality of supplemental procedure modules.

16. The program of claim 15, comprising instructions for comparing the input electronic signal to a threshold by the process monitor processor and generating the output electronic signal from the process monitor processor if the input electronic signal is outside the threshold.

17. The program of claim 15, wherein the procedure module or the plurality of supplemental procedure modules comprises a sequence of process automation control programs, a sequence of manual instructions, a sequence of software modules, or a combination thereof.

18. The program of claim 15, wherein each supplemental procedure module of the plurality of supplemental procedure modules is configured to interrupt the procedure module, replace the procedure module with the supplemental procedure module in a memory device, execute in parallel with the procedure module, or a combination thereof.

19. The program of claim 15, wherein the process comprises a batch process.

20. A method for controlling a process with an industrial automation system, comprising:
   transmitting an input electronic signal indicative of a status of a process feature to a process monitor processor;
   applying logic by the process monitor processor based on the input electronic signal;
   generating an output electronic signal from the process monitor processor in response to the input electronic signal;
   executing a procedure module by a sequence engine processor;
   transmitting the output electronic signal from the process monitor processor to the sequence engine processor;
   applying logic by the sequence engine processor based on the output electronic signal;
   selecting one or more of a plurality of supplemental procedure modules by the sequence engine processor based on the output electronic signal;
   executing the selected one or more of the plurality of supplemental procedure modules by the sequence engine processor; and
   updating a production record with data generated by executing the procedure module and the selected one or more of the plurality of supplemental procedure modules.

21. The method of claim 20, comprising executing two or more of the plurality of supplemental procedure modules in parallel by the sequence engine processor.

22. The method of claim 20, comprising executing a scheduling program by the sequence engine processor, wherein the scheduling program instructs the sequence engine processor to execute the procedure module.

23. The method of claim 20, wherein the process comprises a batch process.

* * * * *